3,266,957
BOOSTER EXPLOSIVE OF ULTRAFINE DESENSITIZED CYCLOTRIMETHYLENE-TRINITRAMINE AND METHOD OF PREPARING SAME
Richard H. Stresau, Spooner, Wis., assignor, by mesne assignments, to the United States of America as represented by the Secretary of the Navy
No Drawing. Filed Sept. 24, 1964, Ser. No. 398,809
2 Claims. (Cl. 149—11)

The present invention relates to new explosives and particularly to an improved desensitized RDX (cyclotrimethylene trinitramine) and improved desensitization process.

The standard booster explosive, until relative recent times, has been tetryl. Because of its poor resistance to elevated temperatures, tetryl has been displaced by RDX in many applications. However, pure RDX is more sensitive than tetryl so desensitized mixtures of RDX are used. One such mixture which has gained much use is known as CH–6 (97.5% RDX, 1.5% calcium stearate, 0.5% polyisobutylene, and 0.5% graphite). Initiation of tetryl or CH–6 by small sources is difficult or unreliable. Reliable initiation of tetryl requires at least 10 grams per foot MDF and reliable initiation of CH–6 requires 20 grains per foot MDF.

The material of the present invention, like CH–6 is a desensitized RDX. Some methods and compounds used to desensitize RDX are known in the prior art. One particular patent, U.S. Patent No. 2,719,153 discloses a method for desensitizing RDX, where particles of RDX were dissolved in warm water containing sodium stearate to form a slurry and a water solution of $CaCl_2$ was added to precipitate the Na-stearate and thus coat the RDX particles. However, the instant invention provides an improved desensitized RDX product, an ultra-fine RDX, by an improved process phich produces an ultra-fine slurry and coats each of the ultra-fine particles without drying thus reducing the opportunity for agglomeration and insuring the coating of each individual particle.

It is an object of the invention therefore to provide an improved desensitized cyclotrimethylene-trinitramine.

Another object of the invention is to provide a process for producing an improved desensitized cyclotrimethylene-trinitramine.

A further object of the invention is to provide an ultra-fine desensitized cyclotrimethylene-trinitramine.

Other objects and many of the attendant advantages of this invention will become readily appreciated as the same becomes better understood by reference to the following detailed description.

In accordance with the instant invention, improved desensitized cyclotrimethylene-trinitramine (RDX) of ultra-fine particle size was prepared as follows: cyclotrimethylene-trinitramine was dissolved to saturation, in boiling acetone and the solution poured into and mixed with chilled distilled water while stirring the water vigorously. The usual proportion was 8.5 grams of cyclotrimethylene-trinitramine to 100 cubic centimeters of acetone (approx. 55% saturation). The quantity of water used was two to three times that of acetone. This produced an ultra-fine precipitate (5 micron maximum particle size). The precipitate was allowed to settle and the supernatant liquid removed. Then the precipitate was washed to remove the acetone, and the excess moisture was removed by either decanting or filtering, but without drying. The wet cyclotrimethylene-trinitramine precipitate was added to a solution of sodium stearate in distilled water and stirred to form a slurry (a small amount of oil soluble red dye was added to the stearate solution). The stearate was 1.5% by weight of the cyclotrimethylene-trinitramine precipitate. While continuing to stir, an excess of a distilled water solution of calcium chloride was gradually added, precipitating a calcium stearate and leaving a sodium chloride solution which was removed by washing on a filter. The calcium stearate completely coated each individual ultra-fine particle of the cyclotrimethylene-trinitramine (the oil soluble dye, of course, followed the stearate and colored the resulting product pink; the uniformity of the color was visible evidence of the uniformity of the coating). After filtering, the material was dried in an aluminum pan at about 80° C. Yields approx. 90%.

This material although of equivalent sensitivity to CH–6 and significantly less sensitive than tetryl, can be initiated reliably by means of five grains per foot MDF.

Desensitized ultra-fine cyclotrimethylene-trinitramine can be made with stearate content from approx. 1 to 19% by the instant invention.

Obviously many modifications and variations of the present invention are possible in the light of the above teachings. It is therefore to be understood that within the scope of the appended claims the invention may be practiced otherwise than as specifically described.

What is claimed is:
1. An improved booster explosive comprising:
    (a) ultra-fine particles of cyclotrimethylene-trinitramine whose particle size is 5 microns and less,
    (b) said particles being coated with from approx. 1 to 19 percent calcium stearate as desired to desensitize said cyclotrimethylene-trinitramine to where it can be initiated reliably by means of five grains per foot MDF.
2. A method for producing ultra-fine desensitized cyclotrimethylene-trinitramine, comprising:
    (a) dissolving cyclotrimethylene-trinitramine in boiling acetone in saturation,
    (b) rapidly mixing said acetone solution with 2 to 3 times the quantity of chilled distilled water to form an ultra-fine precipitate of 5 micron maximum particle size,
    (c) allowing said precipitate to settle,
    (d) remove the supernatant liquor and wash said precipitate to remove excess acetone,
    (e) remove excess moisture from said precipitate without drying,
    (f) add a solution of sodium stearate in distilled water to said precipitate and stir to form a slurry,
    (g) while continuing to stir said slurry gradually add a distilled water solution of calcium chloride to precipitate a calcium stearate, which coats said individual ultra-fine particles of said cyclotrimethylene-trinitramine, and leaving a sodium chloride solution,
    (h) separating the coated solid particles from the liquid by filtration and washing to remove soluble material,
    (i) drying the solid particles.

No references cited.

L. DEWAYNE RUTLEDGE, *Primary Examiner.*
BENJAMIN R. PADGETT, *Examiner.*